United States Patent [19]

Bear

[11] Patent Number: 4,852,621

[45] Date of Patent: Aug. 1, 1989

[54] BOTTLED WATER PRESSURIZATION SYSTEM

[76] Inventor: Don E. Bear, 1301 Camino Miraflores, Tucson, Ariz. 85745

[21] Appl. No.: 83,110

[22] Filed: Aug. 10, 1987

[51] Int. Cl.$^4$ ............................ B65B 1/30; B65B 3/26
[52] U.S. Cl. ........................................ 141/83; 141/94; 141/198
[58] Field of Search .................... 141/1, 18, 83, 94, 95, 141/96, 98, 198, DIG. 2; 177/1, 45, 59, 60, 63, 64; 222/52, 58

[56] References Cited

U.S. PATENT DOCUMENTS

| | | | |
|---|---|---|---|
| 3,097,670 | 7/1963 | Berman | 141/83 |
| 3,179,292 | 4/1965 | Terry | 222/52 |
| 3,273,577 | 9/1966 | Moore et al. | 137/13 |
| 3,502,029 | 8/1968 | Halladay | 417/360 |
| 3,653,413 | 4/1972 | Sheya | 141/1 |
| 3,825,154 | 7/1974 | Jaeger | 222/136 |
| 4,069,841 | 1/1978 | Bartlett | 137/568 |
| 4,226,267 | 10/1980 | Meacham, Jr. | 141/18 |

Primary Examiner—J. R. Scott
Attorney, Agent, or Firm—Cahill, Sutton & Thomas

[57] ABSTRACT

A bottled water pressurization system draws purified water from a five gallon bottle by means of an electric pump, forcing the purified water into a tank containing a certain quantity of pressurized air, maintaining a level of water in the tank sufficient to produce a pressure of approximately 25 to 50 pounds per square inch. An outlet of the tank delivers pressurized water to a faucet or spigot, coffee machine, an ice maker, a refrigerator, a hot and/or cold drinking water delivery unit, or other such appliance. A flexible tube is connected to the pump inlet and draws water from the bottle through an upright tube and cover assembly inserted into and over the mouth of the bottle. The upright tube extends nearly to the bottom of the bottle. A one-way valve attached to the bottom of the upright tube prevents reverse flow spillage of residual water in the upright tube when it is removed from an empty bottle and installed in a full one. A low water level sensor produces a control signal to actuate a low water level switch to disable the electric pump when the bottle is empty.

14 Claims, 3 Drawing Sheets

TO FAUCETS, APPLIANCES (PRESSURIZED)

TO APPLIANCES

SUPPLY

ACCUM.

HEATER

INDICATOR
CONTROLLER

WEIGHT OR PROXIMITY SENSOR

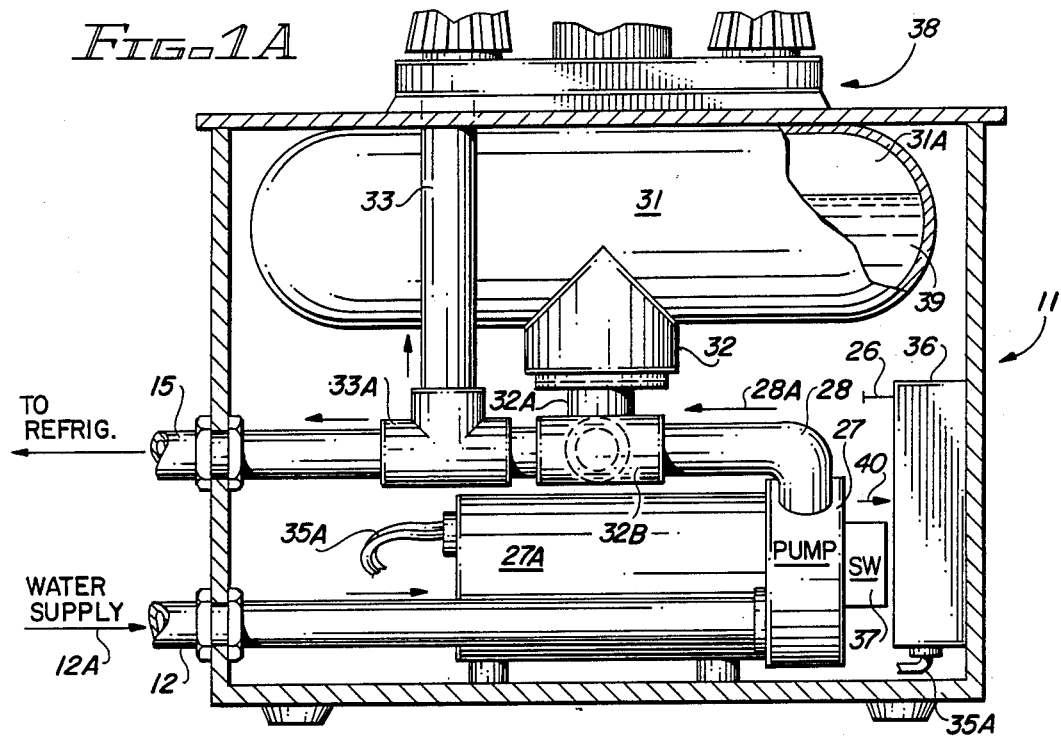
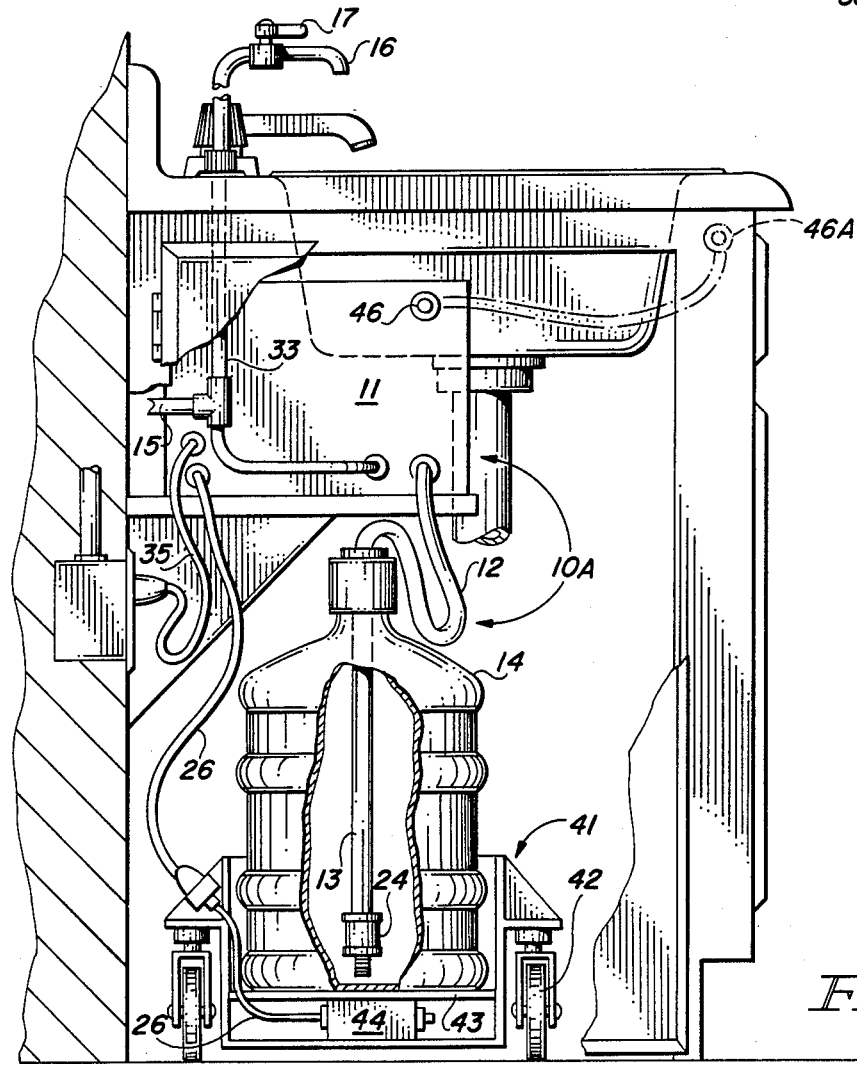

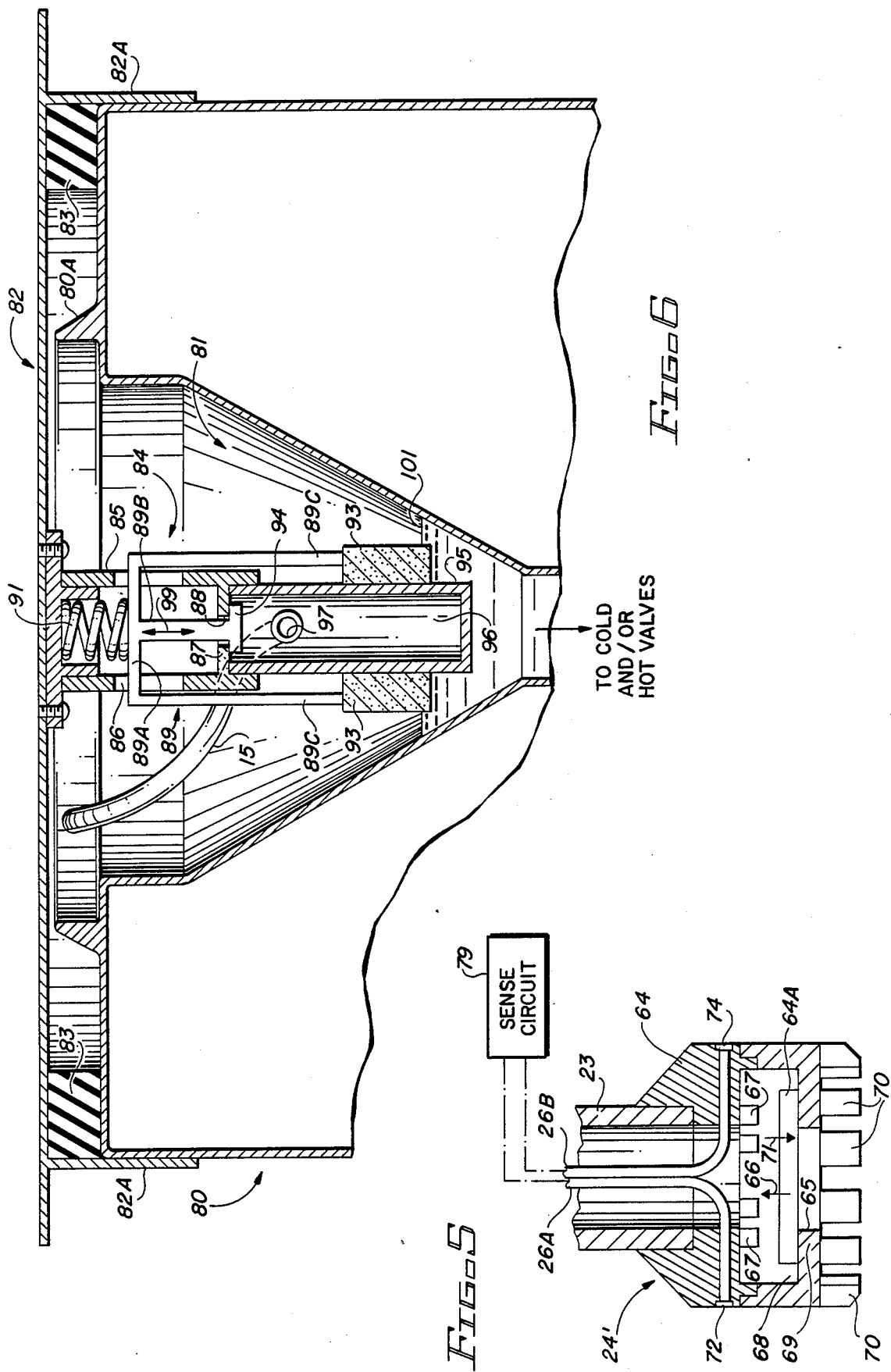

BOTTLED WATER PRESSURIZATION SYSTEM

BACKGROUND OF THE INVENTION

The invention relates to devices for convenient delivery of purified water from bottles, such as conventional five gallon bottles, and particularly to devices for delivering pressurized purified water from a five gallon bottle located at or near the floor level.

The presence of minerals and impurities in water that adversely affects the taste and/or safety of the water for drinking purposes has led to a large demand for purified water. The production and delivery of purified water is a large, worldwide industry. Purified bottled water commonly is delivered to millions of homes in five gallon plastic bottles. Persons who receive such bottled water delivery services also usually obtain dispenser units designed to support the bottle when inverted, usually at approximately counter top level. The seal of the unopened bottle is removed, the full bottle is lifted and inverted, and its neck is inserted into an open-topped reservoir of the dispenser unit. The neck of the bottle forms a "valve" when the water level in the reservoir reaches the neck of the bottle by preventing air from entering the bottle and thereby preventing more water from draining out of the bottle. A dispensing valve connected to the bottom of the reservoir allows the purified water to be dispensed by gravity flow into a drinking glass or the like. The above-described dispensing unit is relatively inexpensive. However, the heavy, filled five gallon water bottle must be lifted, inverted, and placed on the dispenser. Many people, especially older people, find it very difficult to lift filled five gallon bottles; injuries an accidents often occur during such lifting. Inconvenient spillage of water often occurs as the bottle is inverted and positioned over the mouth of the dispenser unit. Furthermore, the only way purified water can be drawn from the dispenser unit is by gravity flow from the spigot. Many people would like to have purified water supplied to ice makers, hot and/or door cold drinking water delivery units of their refrigerators, and other appliances. However, this is impossible with the above-described dispensing unit.

To avoid the inconvenience of the above-described dispensing units, some vendors have provided various activated charcoal filtering systems that are connected to existing plumbing systems to remove impurities from the cold tap water. Pressurized water from the filter is supplied to an extra spigot installed adjacent to a kitchen sink or a wet bar. A tube connected from the charcoal filter outlet can be connected to a refrigerator ice maker. Replacement of the charcoal cartridges of such filter systems is inconvenient and somewhat expensive. Furthermore, many undesirable minerals and other non-organic materials, including toxic substances that may be present in municipal tap water are not removed by activated charcoal filters.

Other vendors supply reverse osmosis filtering systems that are capable of supplying a few gallons of highly purified water per day. Therefore, the water supplied from reverse osmosis filtering systems is not adequate for some purposes. Furthermore, even low output reverse osmosis filtering systems are very expensive.

The closest prior art is believed to be a system that utilizes a 12 volt DC electric pump that draws water from a built-in reservoir and supplies the water directly from the electric pump to a water delivery system in a recreational vehicle, boat, etc. A control switch in the delivery system is actuated to turn on the electric pump to initialize delivery of water from the system and is actuated again to stop delivery. This type of device is commonly used in recreational vehicles, such as travel trailers, boats and motor homes, and can remove water only from the installed reservoir. However, the system would be completely unsuitable for the purpose of supplying purified water because the installed reservoir ordinarily is filled with municipal water which is used to supply water to the bathroom facilities in those vehicles as well as to the kitchen faucet, appliances, etc.

Thus, there is an unmet need for an inexpensive system that provides a continuous supply of pressurized purified water drawn from five gallon bottles of the type in which purified water is commonly delivered, located approximately at floor level.

SUMMARY OF THE INVENTION

Accordingly it is an object of the invention to provide an inexpensive apparatus for drawing purified water from a five gallon water bottle or the like positioned upright approximately above, below or at floor level to supply continuously pressurized purified water drawn from the bottle to a spigot, ice maker, hot and/or cold drinking water unit, coffee maker, refrigerator equipped with ice maker and/or door drinking water unit and other appliances using drinking water.

It is another object of the invention to provide an apparatus of the type described which indicates when the level of water in the bottle is low.

It is another object of the invention to eliminate the lifting of full five gallon water bottles to waist-height dispensing units.

It is another object of the invention to provide an apparatus of the type described that avoids inconvenient spillage of water when an empty bottle is replaced with an inverted full bottle.

It is another object of the invention to provide an apparatus of the type described wherein an electric pump is disabled when the water level in the bottle is low, preventing the pump it from running without water.

It is another object of the invention to provide an apparatus to supply water from the pressurized water system to existing dispensing units that use the inverted bottle, so that the hot and/or cold spigots of the existing dispensing units can continued to be used.

Briefly described, and in accordance with one embodiment thereof, the invention provides an apparatus for supplying purified pressurized water from an unpressurized bottle, such as a conventional five gallon purified water delivery bottle, including a sealed tank containing a quantity of pressurized air, a motorized pump having its outlet connected to pump water through an inlet/outlet opening into the tank, an upright tube with a flexible hose connected to the inlet of the pump which extends through a cover placed over the mouth of the bottle and extending to a level near the bottom of the bottle, the inlet/outlet opening being located at the bottom of the tank for supplying continuously pressurized water to utilization devices such as a faucet, coffee maker, ice maker, hot and/or cold water drinking water delivery unit, refrigerator, and/or other appliances. Use of a single inlet/outlet opening prevents turbulence that causes "water logging" in which compressed air in the tank is released through the inlet/outlet opening. In the described embodiment of the invention, a one-way valve is provided at the bottom of the upright tube for preventing leakage and spillage of residual water in the upright tube when it is removed from the empty bottle and inserted into a full bottle. In one embodiment of the invention, a device is attached to the bottom of the upright tube for sensing the level of water in the bottle and producing a control signal when the level of water in the bottle reaches a selected level an inch or so from the bottom. The apparatus includes a device for sensing the pressure in the tank and turning off the motorized pump when the pressure in the tank exceeds a selected maximum level and turning on the pump when the pressure in the tank falls below a selected minimum level. The control signal disables the pump when the water in the bottle falls below the selected level in order to prevent the pump from running when the water bottle is empty, and may actuate a indicator light responsive to the control signal which prompts a user to replace an empty bottle with a full one. In one described embodiment of the invention, a low cart supports the water bottle slightly above floor level, and is conveniently rolled into an under-counter space in which the apparatus is installed. In one embodiment of the invention, the control signal is produced by a weighing proximity, or light emitting device and produces the control signal when the water therein in the bottle falls below a certain level indicating that the bottle is almost empty. In one embodiment of the invention, the control signal is produced by means of a proximity or light beam device installed along the sides of the bottle. In one embodiment of the invention, the control signal is produced by detecting the difference between presence of water and presence of air by measuring the conductance or capacitance of water or air at the certain level. In one embodiment, a valve assembly is provided which extends into the water cavity of a conventional dispensing unit or which an inverted water bottle usually is placed. A delivery tube connected to the inlet/outlet of the tank is connected to the valve assembly, which meters the flow of the pressurized, purified water into the water cavity of the dispensing unit, which then can be used without lifting and inverting the water bottle.

BRIEF DESCRIPTION OF THE DRAWINGS

FIG. 1A is a section view of part of the embodiment shown in FIG. 1.

FIG. 2A is a partial cutaway section view of an alternate embodiment of the invention.

FIG. 5 is a partial section view of a one-way valve and sensor unit that may be utilized in conjunction with the embodiments of FIGS. 1 and 2A.

FIG. 6 is a section view of an apparatus to be placed on top of an existing gravity flow dispenser instead of the inverted bottle, to allow continued use of the gravity flow dispenser without the user having to lift and invert the water bottle and place it in the dispenser.

DESCRIPTION OF THE PREFERRED EMBODIMENTS OF THE INVENTION

Figure 1:
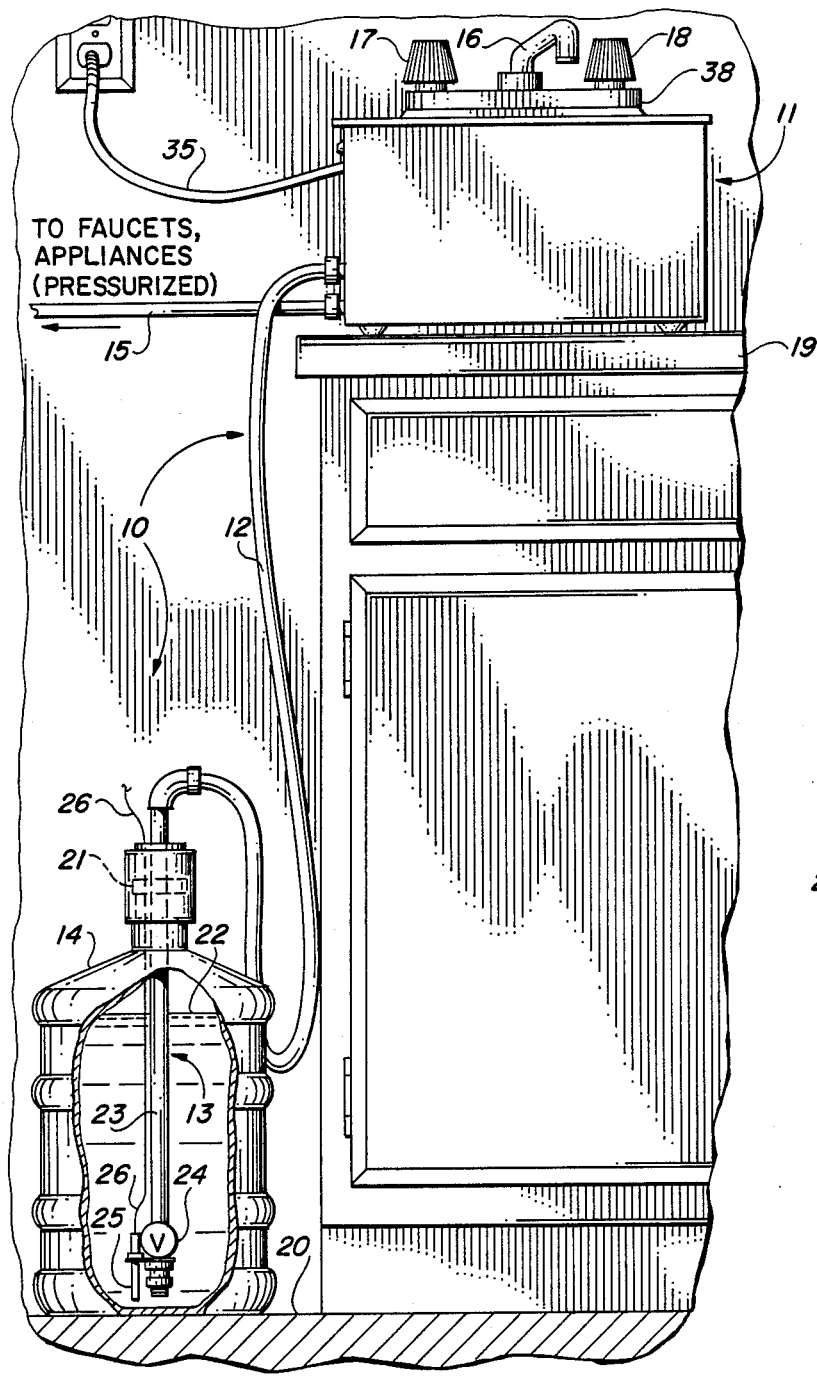
FIG. 1 is a partial cutaway elevation view of one embodiment of the invention.

Referring now to the drawings, in FIG. 1 reference numeral 10 designates a pressurized purified water delivery system including a pressurization device 11 resting on a counter surface 19, a conventional five gallon plastic or glass purified water bottle 14 resting on or below a floor surface, and a flexible hose 12 connected by an assembly 13 that extends inside of bottle 14. Plastic tube 12 is connected to the upper end of a rigid upright tube 13 extending through a cover assembly 21 nearly to the bottom of the interior of bottle 14. The cover assembly 21 centers the tube 13 in bottle 14 and provides a tight slip fit for height adjustment of the tube 13 in the bottle 14, and allows outside air to pass into the bottle 14 to replace water removed via tube 13. A one-way valve 24 is attached to the bottom end of upright tube 13. Also attached to the lower end of tube 13 is a water level sensor 25 which may be mounted inside or outside tube 13. An electrical cable 26 is connected to sensor 25 and produces a signal that indicates when the water level 22 in bottle 14 falls below a point approximately an inch above the bottom thereof. Sensor 25 can be a device that detects the presence of water or air by conductance or capacitance measurements using small electrodes encased in plastic inside the tube and may be integrated as part of the one way valve 24.

The pressurization unit receives purified water drawn through flexible tube 12 and upright tube 13 from bottle 14, and produces a continuous supply of pressurized water at approximately 25 pounds to 50 pounds per square inch through tube 15 in the direction of the adjacent arrow to a refrigerator, ice making device, hot and/or cold drinking water delivery unit or other appliance. Pressurization unit 11 is connected by an electrical cord 35A to a power source. A faucet assembly 38 includes a delivery pipe 16 and control knob 17. Control knob 18 is optional, and can be provided if both hot and cold water delivery are provided. Control knob 17, and delivery tube 16 may be an integral unit. The pressurization unit 11 can be designed for 115 VAC use or designed for 12 VDC use, or both.

The sectional view of FIG. 1A shows the operative assembly within pressurization unit 11. Purified water supply tube 12 is connected to the inlet of a pump 27, which is driven by an electrical motor 27A. Pump 27 and pump motor 27A with pressure switch 37 can be a 200 series unit manufactured by SHURFLO, available in 12 VDC, 24 VDC, 115 VAC, 230 VAC, and can be capable of producing a nominal flow of 0 to 3.9 gallons per minute and uses from 0.3 amperes to 14 amperes, depending upon the required motor voltage.

Pump and motor assembly 27, 27A, when energized, draw purified water from bottle 14 in the direction of arrow 12A, and force it in the direction of arrow 28A through a pipe 28 connected between the outlet of pump 27 and the inlet/outlet 32 of a captured air reservoir 31, which has a volume of at least approximately one half gallon. A pressure switch 37 is connected to pump 27 and senses the pressure of water 39 in tank 31, and switches the pump motor 27A on or off. Pressure switch 37 receives electrical power from electrical cord 35 (FIG. 1) and controls delivery of electrical power to pump motor 27A and thereby turns off pump motor 27A when a sufficient amount of water 39 has been pumped into tank 31 through tube 28 and to T-connector 2B to cause the pressure sensed by pressure switch 37 to reach a maximum level of approximately 50 pounds per square inch. Pressure switch 37 also turns on the pump motor 27A when the amount of water in tank 31 falls to a level that causes the pressure in the tank sensed by pressure switch 37 to reach a minimum level of approximately 25 pounds per square inch. Electrical conductors 26 are connected from sensor 25 to an input of level control unit 36 to turn off the pump motor when the bottle is nearly empty. Level control unit 36 responds to the sensor 25 signal control or power switch to control the pump motor 27A. One skilled in the art can readily provide a level control unit 36 that is identical or similar to various commercially available devices marketed by Red Jacket, Sears, and others.

The inlet/outlet opening 32 at the bottom of pressurized tank 31 is connected by a pipe 32A and T-connector 32B to tube 15 to provide a continuous pressurized supply of water to an appliance or other utilization device, and may optionally be connected by a T-connector 33A to pipe 33 and faucet 38.

Figure 2:
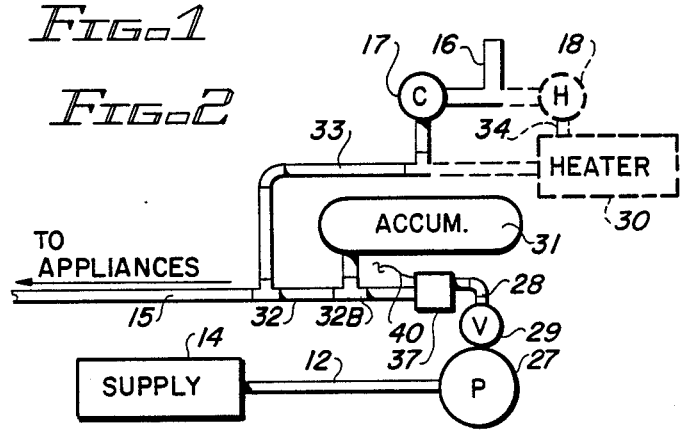
FIG. 2 is a schematic diagram of the pressurized purified water delivery system of the present invention.

The overall structure shown in FIGS. 1 and 1A perhaps can be better understood by reference to the schematic plumbing diagram of FIG. 2. In FIGS. 1, 1A, and 2 the same reference numerals are used to designate the same or similar elements. Reference numeral 14 again indicates the water bottle located approximately at floor level. It is connected by tube 12 to pump 27. A one-way valve, such as a one-way valve 29 in FIG. 2, which may be built into pump 27, is connected in series with conduit 28 to the T-connector 32B of pressurized accumulator tank 31. Pressure sensor switch 37 produces pump motor control through conductors 40. The inlet/outlet opening on the bottom of pressurized tank 31 is connected to T-connector 32B and tube 32 to appliance delivery tube 15, and also optionally by the above-mentioned T-connector 33A and tube 33 to the cold water faucet 17. Optionally, tube 33 also can be connected to a local electric heater unit 30, which is connected by tube 34 to hot water faucet 18, as shown by dotted lines in FIG. 2.

In operation, pressure switch 37 turns on pump motor 27A if the pressure of water 39 in pressurized tank 31 falls below approximately 25 pounds per square inch, if there is ample water in bottle 14. Pump motor 27A then continues to run until a sufficient amount of additional water has been pumped into the tank to increase the pressure to approximately 50 pounds per square inch, unless the bottle 14 is emptied.

It is very important that there be only a single inlet/outlet tube 32 at the bottom of tank 31 in order to prevent turbulence of water inside tank 31 when water is being simultaneously withdrawn and replenished. Such turbulence in the tank is highly undesirable, because it could result in generation of bubbles and voids in the water being released through tube 32A, thereby reducing the pressure of air the volume 31A above water 39 in the tank and reducing the pressure of water supplied by the system. If this phenomena, referred to as "water logging" occurs, the tank becomes useless and the pump cycles excessively.

If the level of the purified water in bottle 14 falls below an inch or so above the bottom of the bottle, water level sensor 25 sends a signal via conductors 26 to level control unit 36, turning pump motor 27A off so that pump 27 will not be damaged by running without water. Optionally, conductors also can be connected from the controller 36 to a low water level indicator light 46 (FIG. 2A), which can be mounted either on the housing of pressurization unit 11, or at a different convenient location 46A.

FIG. 2A shows an alternate embodiment of the invention suitable for under-counter installation. A cart 41 supported on castors such as 42 supports water bottle 14 a few inches above the level of the floor. The weight of the bottle 14 is supported on a platform 43. A weight sensor 44 indicates the weight of bottle 14 and the water therein. A signal carried from weight sensor 44 by conductors 26 indicates when the water level in the bottle 14 is below a certain level an inch or so above the bottom of bottle 14. This signal actuates the water level control unit 36 to turn off pump motor 27A to prevent the pump from running without water.

Figure 3:
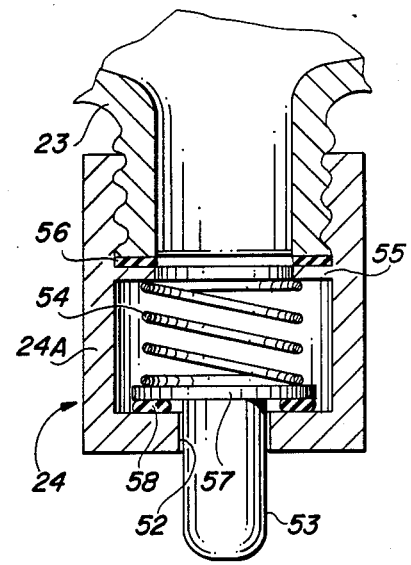
FIG. 3 is a partial section view of a one-way valve that may be utilized in conjunction with the embodiments of FIGS. 1 and 2A.

FIG. 3 shows a suitable structure for valve 24. It includes a cylindrical housing with a threaded upper opening that mates with corresponding threads of the lower end of tube 23. A clearance hole 52 is centered in the bottom of housing 24A. A spring loaded plunger 53 extends through clearance hole below the bottom of housing 24 and contacts the bottom inner surface of bottle 14 when the device is installed and the assembly 13 is in place as shown in FIG. 1. Plunger 53 is connected to a cylindrical valve plate 57. The upper surface of valve plate 57 engages a compression spring 54, the upper end of which rests against an annular flange 55 attached to the inner wall of housing 24A. An annular gasket 56 is pressed between the upper surface of annular flange 55 and the rim of the bottom of tube 23, forming a seal. A resilient O-ring 58 disposed in a suitable groove on the inner surface of the bottom of housing 24 around clearance hole 52 forms a seal with valve plate 57 when assembly 13 is being removed from bottle 14, thereby preventing residual water in tube 23 from leaking through clearance hole 52 when assembly 13 is removed from a nearly empty bottle and transferred to a full one. When assembly 13 is in place, with cover assembly 21 over the mouth of bottle 14, plunger 53 contacts the inner bottom surface of bottle 14, pushing valve plate 57 upward, allowing pump 27 to draw water upward through clearance hole 52 into tube 23, into flexible tube 12, and into the inlet of pump 27.

Figure 4:
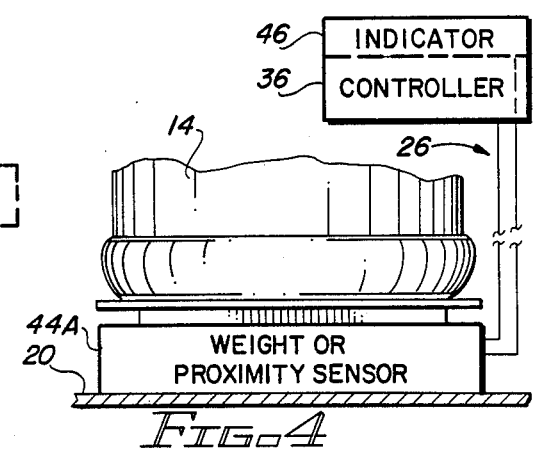
FIG. 4 is a partial elevational view of a device for producing a control signal indicating when the bottle is nearly empty.

In FIG. 4, an alternate weight, proximity, or light emitting/sensing device 44A is shown. Sensing device 44A rests on floor surface 20. The bottom of bottle 14 rests on the platform of sensor 44A, and generates a signal on conductors 26 indicating that the level of purified water in bottle 14 has fallen below a selected level, generally one or two inches from the bottom of the bottle. The signals on conductor 26 then cause the level control unit 36 to disable the pump motor and turn on a low water level indicator light 46. A variety of proximity sensors are readily implementable, so there is no need to describe their various structures.

FIG. 5 shows a suitable alternate structure for valve 24. In FIG. 5, an alternate valve and water level detection assembly 24' is connected to the bottom of upright tube 23, and includes a housing 64 having a lower surface with an inlet opening 65 therein. A rubber valve plate 64A or equivalent valve plate structure is movably located in volume 68 enclosed by housing 64. A plurality of spaced tabs 70 are attached to the bottom 69 of housing 64. The spaces between tabs 70 allow water to be drawn through inlet opening 65 into the volume 68, which is in open communication with the passage through upright tube 23. A plurality of spaced tabs 67 attached to the upper surface of volume 68 limit the upward movement of rubber valve plate 64A in the direction of arrow 66 when the pump is operating, drawing water through the spaces between tabs 67 into tube 23. When the pump is off, the weight of water in upright tube 23 and the weight of valve plate 64 causes it to return in the direction of arrow 71 to seal the interior volume 68, preventing any water from leaking out of volume 68.

At least the upper portion of housing 64 is electrically insulative. A first conductive electrode 72 is disposed on the outer surface of the insulative portion of housing 64, and is connected by an electrical conductor 26A to a resistance sensing circuit 79. A second electrode 74 is connected by conductor 26B to resistance sensing circuit 79. Resistance sensing circuit 79 is contained in controller 36. The resistance sensed thereby will be extremely high if the level of water in bottle 14 has fallen below the level of electrodes 72 and 74. The sensed resistance will be much lower if the level of water in the bottle is above electrodes 72 and 74. Electrodes 72 and 74 can be located roughly an inch from the bottom of tabs 70, which can rest on the bottom of bottle 14. Those skilled in the art can easily provide a variety of sensing circuits that can provide the function of sense circuit 79.

FIG. 6 shows a structure that can be placed on top of conventional gravity flow dispensing units. In FIG. 6, reference numeral 80 designates a conventional gravity flow dispenser for supporting an inverted five gallon purified water bottle. In normal use, the neck of the inverted water bottle extends into a cavity 81 that opens into the upper surface of dispenser 80. A rim 80A on the upper surface of dispenser 80 supports the shoulder of the water bottle surrounding its neck. In accordance with one aspect of the present invention, a shelf assembly 82 is placed on the upper surface of water bottle stand 80. An annular grommet 83 or the like attached to the under-surface of shelf 82 supports the weight of shelf 82. A perpendicular flange 82A extending downwardly from the bottom of shelf 82 extends along the outer surfaces of the water bottle stand 80 to prevent sideways displacement of shelf 82. A valve assembly 84 is attached to the center of the bottom surface of shelf 82 and extends into cavity 81. The pressurized water unit 11 can be placed on top of shelf 82. The pressurized water delivery tube 15 of unit 11 is routed into the valve assembly 84 so that the pressurized water from unit 11 is metered into cavity 81 to maintain a suitable level of purified water 101 therein. Thus, a user can continue to utilize his or her water gravity flow dispenser 80 without having to lift and invert the water bottle, and may continue to receive cold and/or hot water from the valves or spouts of the dispenser.

FIG. 6 shows details of an implementation of the water valve 84. Tube 85 has a plurality of slots 86 therein, and is rigidly attached to the bottom surface of shelf 82, in generally centered relationship to the top of cavity 81. An annular shelf 87 attached to the inner surface of the bottom of tube 85 has an inlet hole 88 therein. At the bottom of tube 85, a cylinder 95 encloses a volume 96 into which purified water delivery tube 15 communicates via an opening 97, so that pressurized purified water from tube 15 is always present in chamber 96. A valve plate 94 that seals volume 96 from the interior of tube 85 is supported on an extension 89B of a float support mechanism 89. The top of float mechanism 89 is urged downward by a spring 91, the upper end of which is stationary with respect to shelf 82. A plurality of arms 89A of float support 89 extend through slots 86 to vertical float support uprights 89C, the bottom ends of which are attached to floats 93 in the water at the bottom of cavity 81.

When the user withdraws some of the water 101 by opening a hot or cold water spigot, the water level in cavity falls, causing floats 93 and the entire float support assembly 89 to move downward, lowering valve plate 94 and allowing pressurized water to flow upward through hole 88 and out of tube 85 through slots 86, thereby replenishing the withdrawn water. As the water level 101 rises, the float assembly 89 moves upward in the direction indicated by arrows 99, sealing opening 88 and preventing further water flow.

The above-described embodiments of the invention provide a relatively inexpensive means for supplying a continuous, high pressure source of purified water from conventional five gallon delivery bottles. The inconvenience of lifting the bottles, inverting them, and placing them on conventional dispensing devices is avoided, and injuries and accidents and inconvenient spillage that often accompany lifting and inverting of the bottles are avoided. The described invention makes inexpensive purified bottled water available for delivery to refrigerators, ice makers, hot and/or cold water drinking water delivery systems, appliances, and to counter top valve and spigot assemblies, and other appliances. Changing of the five gallon purified water bottles is easily accomplished without inconvenient water spillage and cleanup. Damage to the pump by running dry is avoided by the described water level sensing techniques.

While the invention has been described with reference to a particular embodiment thereof, those skilled in the art will be able to make various modifications to the described embodiment of the invention without departing from the true spirit and scope thereof. It is intended that all elements and steps which perform substantially the same function in substantially the same manner to achieve the same result are within the scope of the invention.

I claim:

1. An apparatus for supplying pressurized water from an unpressurized bottle, comprising in combination:
   (a) a cover having a hole therein and covering an opening at the upper portion of the bottle;
   (b) a sealed tank containing a certain quantity of pressurized air and having an inlet/outlet opening located at the bottom of the tank and a delivery tube connected in open communication with the inlet/outlet opening for delivering pressurized water in the tank to an external utilization device, such as a faucet, or an ice maker and/or a cold drinking water delivery unit of a refrigerator;
   (c) a pump, having an inlet and an outlet, for pumping water from the bottle into the tank;
   (d) a tube connecting the outlet of the pump to the inlet/outlet opening;
   (e) first tubular means extending through the hole in the cover to a level near the bottom of the bottle;
   (f) second tubular means for connecting an upper end of the first tubular means to the inlet opening of the pump;
   (g) first valve means located in the bottle connected to the bottom of the first tubular means for preventing spillage of residual water from the first tubular means when it is removed from the bottle;
   (h) second valve means connected in series relationship with the inlet/outlet opening of the tank for preventing flow of water from the tank back into the outlet of the pump;
(i) a pump motor for driving the pump;
(j) pressure sensing means for sensing the pressure in the tank;
(k) control means connected to the pressure sensing means for turning on the pump motor when the pressure in the tank falls below a first level and turning the pump motor off when the pressure in the tank exceeds a second level that is greater than the first level; and
(l) means for producing a control signal when the level of water in the bottle falls below a selected level near the bottom of the bottle, the control means responding to the control signal by turning off the pump motor, thereby preventing the pump from running dry,
whereby the pump and pump motor operate to maintain a supply of pressurized water from the bottle in the tank and a continuous supply of pressurized water is provided to the utilization device.

2. The apparatus of claim 1 wherein the volume of the tank is approximately one-half gallon.

3. The apparatus of claim 1 wherein the first level of the pressure in the tank is approximately 25 pounds per square inch and the second level of the pressure in the tank is approximately 50 pounds per square inch.

4. The apparatus of claim 3 wherein the bottom of the bottle is located approximately at floor level, whereby the cover in the first tube can be easily removed from the opening of the bottle to allow replacing the bottle, when empty, with another bottle, thereby avoiding the necessity for lifting and inverting a full bottle to a counter high level.

5. The apparatus of claim 1 including an indicator light connected to the control means for indicating when the level of water in the bottle falls below the selected level in response to the control signal, thereby prompting a user to replace the empty bottle with a full one.

6. The apparatus of claim 1 wherein the control signal producing means includes a means located inside the bottle and attached to the first tubular means for sensing the presence of water above a preselected level in the bottle and producing the control signal when the level of water in the bottle falls below the selected level.

7. The apparatus of claim 1 wherein the control signal producing means includes weight sensitive means located outside of the bottle supporting the weight of the bottle and water therein for producing the control signal when the weight of the bottle and water therein falls below a selected weight that indicates that the level of water in the bottle has fallen below the selected level.

8. The apparatus of claim 1 wherein the control signal producing means includes resistance determining means for determining the resistance between first and second electrodes located in the bottle at the selected level to measure a high resistance if water is below the selected level in the bottle and to measure a low resistance if water is above the selected level in the bottle.

9. The apparatus of claim 1 wherein the first valve means includes a valve assembly including a housing having an upper and portion attached in sealed relationship with the lower end of the first tubular means, a lower end portion having a clearance hole therein, a spring loaded plunger extending through the clearance hole and contacting the bottom of the bottom when the first tubular means and stopper are inserted into the bottle for operation, a seal plate attached to the upper end of the plunger, an O-ring gasket surrounding the plunger and the clearance hole and disposed between the portion of the housing surrounding the clearance hole and an under surface of the seal plate, and a compression spring disposed between the upper surface of the seal plate and an annular interior flange attached to an inner surface of the interior of the housing to retain an upper portion of the compression spring, whereby when the first tubular means is removed from the bottle, the compression spring forces the seal plate downward against the O-ring gasket as the plunger is lifted from the bottom of the bottle, preventing leakage of any residual water in the first tubular means through the clearance hole as it is removed from the bottle and inserted into another full bottle.

10. The apparatus of claim 1 including a cart having a support surface elevated slightly from the floor surface for supporting the bottle.

11. The apparatus of claim 1 further including a heating unit connected in open communication with the outlet of the tank, the heating unit having an outlet connected to a hot water faucet.

12. The apparatus of claim 1 wherein the first valve means includes a valve assembly connected in communication with the interior of the first tubular means, the valve assembly including a valve opening through which water can flow from the bottle through the valve assembly into the first tubular means, the valve assembly including a valve plate urged by weight of water contained in the first tubular means to seal the valve opening when the pump is not running.

13. The apparatus of claim 1 further including a cover assembly for covering a gravity flow dispenser having a cavity, and a valve assembly attached to the cover assembly and extending into the cavity, the valve assembly including a chamber and means for connecting the delivery tube in open communication with the chamber, and third valve means responsive to the level of water in the cavity for opening to allow pressurized water supplied to the chamber via the delivery tube to be forced into the cavity until the level of water in the cavity attains a selected level,
whereby a user can dispense water from the gravity flow dispenser without having to lift and invert a water bottle and place it on the gravity flow dispenser.

14. An apparatus for supplying pressurized water from an unpressurized bottle, comprising in combination:
(a) a cover having a hole therein and covering an opening at the upper portion of the bottle;
(b) a sealed tank containing a certain quantity of pressurized air and having an inlet/outlet opening located at the bottom of the tank and a delivery tube connected in open communication with the inlet/outlet opening for delivering pressurized water in the tank to an external utilization device, such as a faucet, or an ice maker and/or a cold drinking water delivery unit of a refrigerator;
(c) a pump, having an inlet and an outlet, for pumping water from the bottle into the tank;
(d) a tube connecting the outlet of the pump to the inlet/outlet opening;
(e) first tubular means extending through the hole in the cover to a level near the bottom of the bottle;

(f) second tubular means for connecting an upper end of the first tubular means to the inlet opening of the pump;
(g) valve means connected in series relationship with the inlet/outlet opening of the tank for preventing flow of water from the tank back into the outlet of the pump;
(h) a pump motor for driving the pump;
(i) pressure sensing means for sensing the pressure in the tank;
(j) control means connected to the pressure sensing means for turning on the pump motor when the pressure in the tank falls below a first level and turning the pump motor off when the pressure in the tank exceeds a second level that is greater than the first level; and
(k) means for producing a control signal when the level of water in the bottle falls below a selected level near the bottom of the bottle, the control means responding to the control signal by turning off the pump motor, thereby preventing the pump from running dry, whereby the pump and pump motor operate to maintain a supply of pressurized water from the bottle in the tank and a continuous supply of pressurized water is provided to the utilization device.

\* \* \* \* \*